(12) United States Patent
Koren et al.

(10) Patent No.: US 12,013,971 B2
(45) Date of Patent: *Jun. 18, 2024

(54) SYSTEM AND METHOD FOR DYNAMIC MANAGEMENT OF PRIVATE DATA

(71) Applicant: Privacy Rating Ltd., Ganey Tikva (IL)

(72) Inventors: Yoseph Koren, Ganey Tikva (IL); Yehonatan Wasserman, Kiryat Ono (IL)

(73) Assignee: Privacy Rating Ltd., Ganey-Tikva (IL)

( * ) Notice: Subject to any disclaimer, the term of this patent is extended or adjusted under 35 U.S.C. 154(b) by 339 days.

This patent is subject to a terminal disclaimer.

(21) Appl. No.: 17/406,272

(22) Filed: Aug. 19, 2021

(65) Prior Publication Data

US 2021/0383023 A1 Dec. 9, 2021

Related U.S. Application Data

(63) Continuation of application No. 16/603,252, filed as application No. PCT/IL2018/050359 on Mar. 28, 2018, now Pat. No. 11,106,824.

(30) Foreign Application Priority Data

Apr. 9, 2017 (IL) .......................................... 251683

(51) Int. Cl.
*G06F 21/00* (2013.01)
*G06F 21/62* (2013.01)
*H04L 9/40* (2022.01)

(52) U.S. Cl.
CPC ...... *G06F 21/6263* (2013.01); *H04L 63/0421* (2013.01); *H04L 63/0428* (2013.01)

(58) Field of Classification Search
CPC ............. G06F 21/6263; G06F 21/6254; H04L 63/0421; H04L 63/0428; H04L 63/0236; H04L 63/0245; H04L 63/0263
See application file for complete search history.

(56) References Cited

U.S. PATENT DOCUMENTS 6,751,728 B1 6/2004 Gunter et al.
6,775,780 B1 8/2004 Muttik
(Continued)

FOREIGN PATENT DOCUMENTS

JP 3957712 B2 8/2007
JP 4887081 B2 2/2012
(Continued)

OTHER PUBLICATIONS

International Search Report of PCT Application No. PCT/IL2018/050359 mailed on Jul. 12, 2018.
(Continued)

*Primary Examiner* — Kendall Dolly
(74) *Attorney, Agent, or Firm* — PEARL COHEN ZEDEK LATZER BARATZ LLP

(57) ABSTRACT

Systems and methods of dynamic management of private data during communication between a remote server and a user's device, including receipt of a request for retrieval of at least one data packet from the user's device, wherein the user's device is configured to provide a response corresponding to the received request, determination of at least one communication data type of the at least one data packet corresponding to the received request, receipt of a privacy preference for the user's device, wherein the privacy preference comprises a list of allowed data packet communication types for sharing during communication, modification of data packets corresponding to requests for sharing of responses that are not compatible with the received privacy preference and maintenance of communication between the remote server and the user's device, with sharing of the modified data packet.

37 Claims, 10 Drawing Sheets

(56) References Cited

U.S. PATENT DOCUMENTS

| | | | |
|---|---|---|---|
| 6,965,992 B1 | 11/2005 | Joseph et al. | |
| 6,970,446 B2 | 11/2005 | Krischer et al. | |
| 7,231,027 B2 | 6/2007 | Schmid et al. | |
| 7,548,532 B2 | 6/2009 | Krischer et al. | |
| 7,690,040 B2 | 3/2010 | Frattura et al. | |
| 7,706,314 B2 | 4/2010 | Nedeltchev | |
| 7,797,411 B1 | 9/2010 | Guruswamy et al. | |
| 7,996,670 B1 | 8/2011 | Krishna et al. | |
| 8,266,267 B1 | 9/2012 | Guruswamy et al. | |
| 8,537,818 B1 | 9/2013 | Thesayi et al. | |
| 8,543,808 B2 | 9/2013 | Ahmed | |
| 8,724,553 B2 | 5/2014 | Weniger et al. | |
| 8,761,182 B2 | 6/2014 | Kohn et al. | |
| 9,001,661 B2 | 4/2015 | Zuk et al. | |
| 9,077,692 B1 | 7/2015 | Burns et al. | |
| 9,137,205 B2 | 9/2015 | Rogers et al. | |
| 9,203,806 B2 | 12/2015 | Ahn et al. | |
| 9,215,239 B1 | 12/2015 | Wang et al. | |
| 9,356,876 B1 | 5/2016 | Ben-Dvora et al. | |
| 9,407,646 B2 | 8/2016 | Cruz Mota et al. | |
| 9,419,942 B1 | 8/2016 | Buruganahalli et al. | |
| 9,461,967 B2 | 10/2016 | Zuk et al. | |
| 9,477,836 B1 | 10/2016 | Ramam et al. | |
| 9,560,176 B2 | 1/2017 | Ahn et al. | |
| 9,609,025 B1 | 3/2017 | Betzler et al. | |
| 9,686,193 B2 | 6/2017 | Moore | |
| 9,917,856 B2 | 3/2018 | Ahn et al. | |
| 10,187,412 B2 | 1/2019 | Bartos et al. | |
| 10,257,214 B2 | 4/2019 | McGrew et al. | |
| 10,277,614 B2 | 4/2019 | Koide et al. | |
| 10,348,715 B2 | 7/2019 | Ross et al. | |
| 10,375,097 B2 | 8/2019 | Kopp et al. | |
| 10,412,105 B2 | 9/2019 | Sofka | |
| 10,425,434 B2 | 9/2019 | Kohout et al. | |
| 10,454,961 B2 | 10/2019 | Frayman et al. | |
| 10,530,903 B2 | 1/2020 | Ahn et al. | |
| 10,659,573 B2 | 5/2020 | Ahn et al. | |
| 10,686,831 B2 | 6/2020 | Anderson et al. | |
| 10,805,338 B2 | 10/2020 | Kohout et al. | |
| 10,931,797 B2 | 2/2021 | Ahn et al. | |
| 11,310,146 B1* | 4/2022 | Kaciulis | H04L 63/0428 |
| 2010/0058054 A1 | 3/2010 | Irvine | |
| 2012/0005720 A1* | 1/2012 | McGloin | G06F 21/6263 726/1 |
| 2012/0222083 A1 | 8/2012 | Vaha-Sipla et al. | |
| 2013/0305044 A1 | 11/2013 | Gutt et al. | |
| 2013/0318347 A1* | 11/2013 | Moffat | H04L 63/0435 713/168 |
| 2014/0259147 A1 | 9/2014 | L'Heureux et al. | |
| 2014/0331054 A1 | 11/2014 | Hanumantharayappa et al. | |
| 2016/0283859 A1 | 9/2016 | Fenoglio et al. | |
| 2017/0041297 A1 | 2/2017 | Ling et al. | |
| 2017/0098215 A1 | 4/2017 | Brotsky et al. | |
| 2017/0118638 A1 | 4/2017 | Zhang et al. | |
| 2017/0161499 A1 | 6/2017 | Hentunen | |
| 2018/0359811 A1 | 12/2018 | Verzun et al. | |
| 2019/0034826 A1 | 1/2019 | Ahmad et al. | |
| 2019/0149523 A1 | 5/2019 | Shin et al. | |
| 2020/0186507 A1* | 6/2020 | Dhanabalan | H04L 63/0272 |

FOREIGN PATENT DOCUMENTS

| | | |
|---|---|---|
| KR | 101503009 B1 | 10/2014 |
| WO | WO 2013/103782 | 7/2013 |
| WO | WO 2014/031041 | 2/2014 |
| WO | WO 2016/146609 | 9/2016 |

OTHER PUBLICATIONS

Office Action for Israeli Application No. 251683, mailed on Jul. 31, 2018.

Office Action for Israeli Application No. 251683, mailed on Sep. 26, 2017.

Supplementary European Search Report for Application No. EP 18785029, mailed on Sep. 24, 2020.

Office Action for U.S. Appl. No. 16/603,252 mailed on Sep. 28, 2020.

Office Action for U.S. Appl. No. 16/603,252 mailed on Jan. 29, 2021.

Notice of Allowance for U.S. Appl. No. 16/603,252 mailed on Apr. 29, 2021.

Ant'onio Casimiro et al. "Proceedings of the Workshop on Secure and Dependable Middleware for Cloud Monitoring and Management" The Association for Computing Machinery, Inc, Dec. 3, 2012.

Hoang T. Dinh et al. A survey of mobile cloud computing: Architecture, applications, and approaches Wireless Communications and Mobile Computing 13(18), Dec. 2013.

Bolin Bing et al. "Differentially Private Data Cubes: Optimizing Noise Sources and Consistency" Proceedings o the 2011 ACM SIGMOD, pp. 217-228, Jun. 2011.

Anderson et al. "Identifying Encrypted Malware Traffic with Contextual Flow Data" Conference: the 2016 ACM Workshop, Oct. 2016.

Akira Yamada et al; "Instrusion Detection for Encrypted Web Accesses"; published in 21st International Conference on Advanced Information Networking and Applications Workshops (AINAW07); Date May 21-23, 2007.

Blake Anderson et al; "Deciphering Malware's use of TLS (without Decryption)"; published in Journal of computer Virology and Hacking Techniques, 195-211; Date Aug. 31, 2017.

Arnon Shimoni et al; " Malicious traffic detection using traffic fingerprint"; published in Article (CrossRef Link); dated 2014.

* cited by examiner

```
┌─────────────────────────────────────────────────┐
│ Receiving a request for retrieval of at least one data │
│ packet from the user's device, wherein the user's │
│ device is configured to provide a response       │
│ corresponding to the received request            │
└─────────────────────────────────────────────────┘
   601 ↓
┌─────────────────────────────────────────────────┐
│ Determining the data type of the at least one data │
│ packet corresponding to the received request    │
└─────────────────────────────────────────────────┘
   602 ↓
┌─────────────────────────────────────────────────┐
│ Receiving a privacy preference for the user's device, │
│ wherein the privacy preference comprises a list of │
│ allowed data packet types for sharing during    │
│ communication                                    │
└─────────────────────────────────────────────────┘
   603 ↓
┌─────────────────────────────────────────────────┐
│ Modifying data packets corresponding to requests │
│ for sharing of responses that are not compatible with │
│ the received privacy preference                  │
└─────────────────────────────────────────────────┘
   604 ↓
┌─────────────────────────────────────────────────┐
│ Maintaining communication between the remote    │
│ server and the user's device, with sharing of the │
│ modified data packets                           │
└─────────────────────────────────────────────────┘
   605
```

Fig. 6A

```
┌─────────────────────────────────────────────────────┐
│ Receiving a request for retrieval of at least one   │
│ data packet from the user's device, wherein the     │
│ user's device is configured to provide a response   │
│ corresponding to the received request               │
└─────────────────────────────────────────────────────┘
         611 ↓
┌─────────────────────────────────────────────────────┐
│ Determining at least one data pattern corresponding │
│ to the received request                             │
└─────────────────────────────────────────────────────┘
         612 ↓
┌─────────────────────────────────────────────────────┐
│ Receiving a privacy preference for the user's       │
│ device, wherein the privacy preference comprises a  │
│ list of allowed data patterns for sharing during    │
│ communication                                       │
└─────────────────────────────────────────────────────┘
         613 ↓
┌─────────────────────────────────────────────────────┐
│ Modifying data packets corresponding to requests    │
│ for sharing of responses and corresponding data     │
│ patterns that are not compatible with the received  │
│ privacy preference                                  │
└─────────────────────────────────────────────────────┘
         614 ↓
┌─────────────────────────────────────────────────────┐
│ Maintaining communication between the remote        │
│ server and the user's device                        │
└─────────────────────────────────────────────────────┘
         615

Fig. 6B
```

SYSTEM AND METHOD FOR DYNAMIC MANAGEMENT OF PRIVATE DATA

CROSS REFERENCE TO RELATED APPLICATION

This application is a continuation of U.S. patent application Ser. No. 16/603,252, filed Oct. 7, 2019, which is a national phase of PCT International Patent Application No. PCT/IL2018/050359, filed Mar. 28, 2018, which claims priority from Israel Patent Application No. 251683, filed Apr. 9, 2018, each of which is incorporated herein by reference.

FIELD OF THE INVENTION

The present invention relates to data management. More particularly, the present invention relates to systems and methods for dynamic management of private data.

BACKGROUND OF THE INVENTION

During communication with external remote servers different types of data are automatically (and uncontrollably) shared, sometimes without the knowledge of the user (e.g., the owner of the data). There are currently only limited ways for the user to manage which data should be shared, with which parties, and at what time periods and/or under what circumstances such that privacy agreements cannot be fully enforced. For example, securing private elements of a user's device engaging in a transaction with a service provider, has been a challenge for many years with the rapid development of computer technology.

In recent years, an increasing number of communication sessions are being biased (in terms of shared data and application usage) toward one party which is advantageous due to technological superiority, formal regulation power, and/or any other item. Such biasing may occur due to rapid development of communication related software, as well as due to development of computer technology.

Social network service providers usually collect user (private) data, for example collect user's online habits. Data collection is usually carried out by a service provider requesting to share user's (private) information while the user's device automatically shares the requested information accordingly. Actions are executed by dedicated software (e.g., social plug in), which upload data requests when visiting web sites and/or applications. Such requests may be direct script by the service provider (e.g. cookie etc.), or indirect script hidden within links to other (partner) application provider (e.g. social plug-in, SDK, API etc.). While some devices allow blocking collection of certain private parameters, for example the location, only data emerging from sensors, such as global positioning system (GPS) sensors, can be managed by user while other sources of location (e.g. mobile network, IP provider, country, time zone) cannot be controlled so that in that case location information can still be collected. Thus, location information can be collected while bypassing the instructions of the user (e.g., collecting location from cellular carrier data). Other examples from the same nature may include retrieving form data, retrieving data from flash memory and several other items which do not have the full (or partial) ability to disable and/or block data collection. Some service providers can also collect user data in order to transfer and/or sell to third parties (e.g., to present dedicated ads in the future). Another example may be avoiding biased exchange of information both from the user and the service provider perspectives.

SUMMARY OF THE INVENTION

There is thus provided, in accordance with some embodiments of the invention, a method of dynamic management of private data during communication between a remote server and a user's device, the method including receiving, by the user's device, a request for retrieval of at least one data packet from the user's device, wherein the user's device is configured to provide a response corresponding to the received request, determining, by the user's device, the data type of the at least one data packet corresponding to the received request, receiving, by the user's device, a privacy preference for the user's device, wherein the privacy preference includes a list of allowed data packet types for sharing during communication, modifying data packets corresponding to requests for sharing of responses that are not compatible with the received privacy preference, and maintaining communication between the remote server and the user's device, with sharing of the modified data packets.

In some embodiments, the type of the at least one data packet may be determined from metadata of communication with the remote server. In some embodiments, the method further includes determining, by the user's device, pattern of at least one response corresponding to the received request, and modifying data packets corresponding to requests for sharing of responses, corresponding to at least one data pattern, that are not compatible with the received privacy preference, wherein the privacy preference includes a list of allowed data patterns for sharing during communication. In some embodiments, the user's device includes a database with at least one data packet type corresponding to a request for sharing of data packets from the user's device, and wherein the type of data packets is determined from the database.

In some embodiments, the method further includes linking at least one response to a type of data packet from the user's device, wherein the linking is based on the type and pattern of the at least one response. In some embodiments, the method further includes identifying a response corresponding to a request for sharing of data packets, wherein the identified response is not compatible with the received privacy preference, and providing a response with at least one modified data packet corresponding to the request for sharing types of data packets. In some embodiments, the modification of the at least one modified data packet is selected from the group consisting of data nullification, blocking, data randomization, content modification, change of encoding, change of file template, change of header, change of footer, addition of a predetermined data packet and encryption.

In some embodiments, the method further includes identifying a communication pattern between the server and the user's device, wherein the communication pattern includes at least one request for retrieval of at least one data packet from the user's device and corresponding responses, and issuing an alert upon detection of a change in the identified communication pattern.

In some embodiments, data packets from the user's device are selected from the group consisting of user's device files, user's device characteristics, user's device indirect attributes, user's device sensor data, user's device browser data, user's device form data, user's device dynamic memory and user's device static memory.

There is thus provided, in accordance with some embodiments of the invention, a method of dynamic management of private data during communication between a remote server and a user's device, the method including receiving, by the user's device, a request for retrieval of at least one data packet from the user's device, wherein the user's device is configured to provide a response corresponding to the received request, determining, by the user's device, at least one data pattern corresponding to the received request, receiving, by the user's device, a privacy preference for the user's device, wherein the privacy preference includes a list of allowed data patterns for sharing during communication, modifying data packets corresponding to requests for sharing of responses and corresponding data patterns that are not compatible with the received privacy preference, and maintaining communication between the remote server and the user's device, with sharing of the modified responses.

In some embodiments, the pattern of the at least one response is determined from metadata of communication with the remote server. In some embodiments, the method further includes determining, by the user's device, the type of the at least one data packet of the received request, and modifying data packets corresponding to requests for sharing of responses and corresponding data patterns, corresponding to at least one data packet type, that are not compatible with the received privacy preference, wherein the privacy preference includes a list of allowed data packet types for sharing during communication.

In some embodiments, the user's device includes a database with at least one data pattern corresponding to a request for sharing of data packets from the user's device, and wherein the at least one data pattern compatible with the received request is determined from the database. In some embodiments, the method further includes determining, by the user's device, the type of the at least one data packet of the received request, and linking at least one data pattern to a type of data packet from the user's device, wherein the linking is based on the pattern of the at least one response.

In some embodiments, the method further includes identifying a data pattern corresponding to a request for sharing of data packet types, wherein the identified data pattern is not compatible with the received privacy preference, and providing a response with at least one modified data packet corresponding to the request for sharing types of data packets. In some embodiments, the modification of the at least one modified data packet is selected from the group consisting of data nullification, blocking, data randomization, content modification, change of encoding, change of file template, change of header, change of footer, addition of a predetermined data packet and encryption.

In some embodiments, the method further includes issuing an alert upon detection of a request for sharing data packets, wherein the detected request does not correspond to at least one of data type and data pattern that is compatible with the received privacy preference. In some embodiments, the method further includes identifying a communication pattern between the server and the user's device, wherein the communication pattern includes at least one request for retrieval of at least one data packet from the user's device and corresponding responses, and issuing an alert upon detection of a change in the identified communication pattern.

In some embodiments, data packets from the user's device are selected from the group consisting of user's device files, user's device characteristics, user's device indirect attributes, user's device sensor data, user's device browser data, user's device form data, user's device dynamic memory and user's device static memory.

There is thus provided, in accordance with some embodiments of the invention, a system for dynamic management of private data during communication between a remote server and at least one user's device, the system including a data type database, including at least one data type corresponding to sharing of at least one data packet from the user's device, a privacy preference database, including a list of allowed types of data packets for sharing during communication with the at least one user's device, a communication module, to allow communication between the remote server and the at least one user's device, and a processor, coupled to the response database and to the privacy preference database, wherein the processor is configured to determine at least one data type for sharing of data packet that is compatible with the list of allowed patterns of data packets for sharing.

In some embodiments, the system further includes a user interface to issue an alert upon detection of a request for retrieval of data packets that is not compatible with the privacy preference. In some embodiments, the system further includes a data pattern database, coupled to the processor, wherein the processor is configured to modify data packets corresponding to requests for retrieval of data packets and data types that are not compatible with data patterns from a data pattern database.

In some embodiments, data packets from the user's device are selected from the group consisting of user's device files, user's device characteristics, user's device indirect attributes, user's device sensor data, user's device browser data, user's device form data, user's device dynamic memory and user's device static memory. In some embodiments, at least the communication module and the processor are embedded on a single hardware component.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 6A-6B show flowcharts for a method of dynamic management of private data during communication between a remote server and a user's device, according to some embodiments of the invention.

Figure 1:
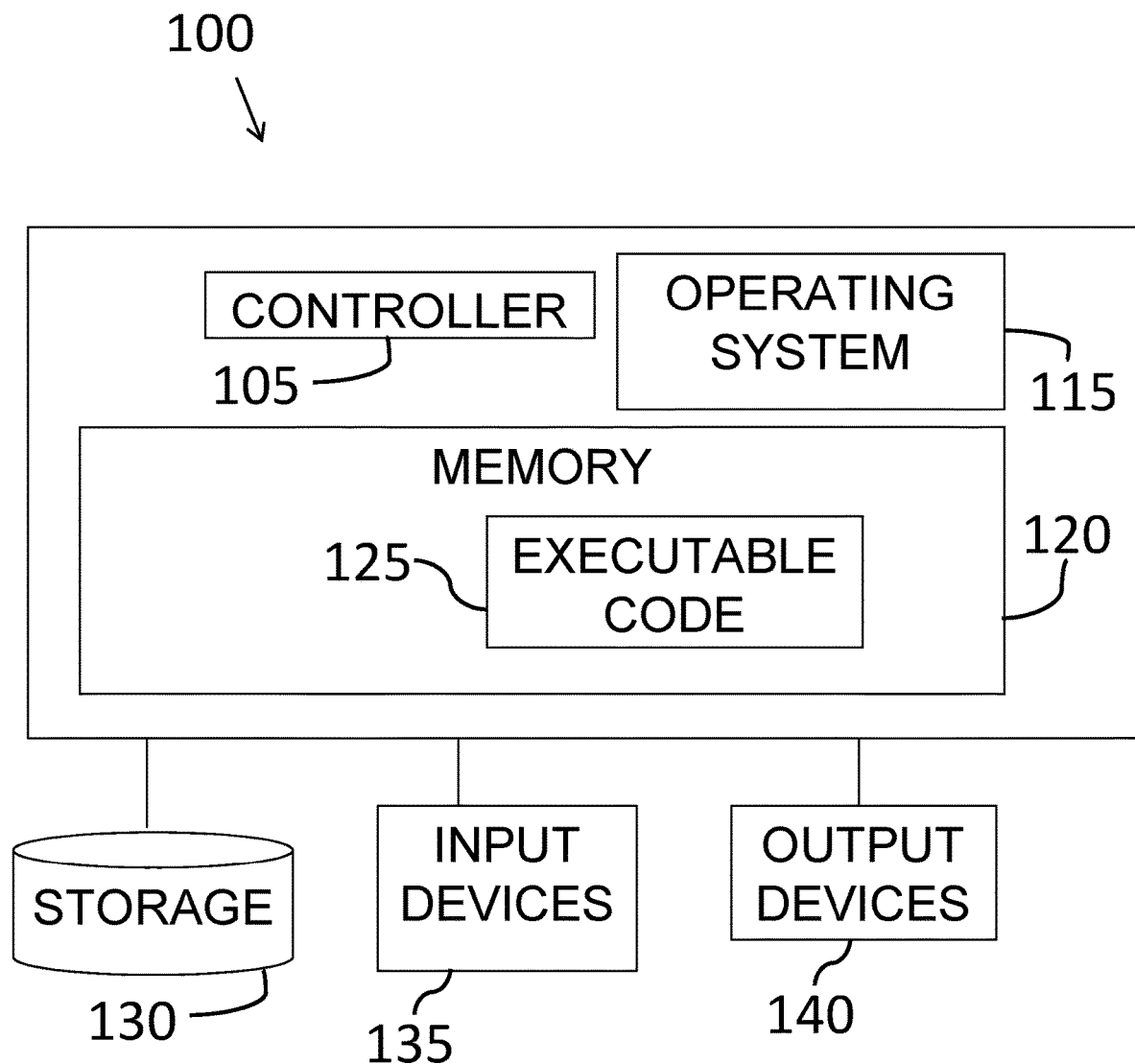
FIG. 1 shows a schematic block diagram of an exemplary computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, showing a schematic block diagram of an exemplary computing device, according to embodiments of the present invention. Computing device 100 may include a controller 105 that may be, for example, a central processing unit processor (CPU), special purpose processor such as a graphic processing unit (GPU), communication control processing (CCP), a chip or any suitable computing or computational device, an operating system 115, a memory 120, a storage 130, an input devices 135 and an output device 140. Controller 105 may be configured to carry out methods as disclosed herein by for example executing code or software.

Operating system 115 may be or may include any code segment designed and/or configured to perform tasks involving coordination, scheduling, arbitration, supervising, controlling or otherwise managing operation of computing device 100, for example, scheduling execution of programs. Operating system 115 may be a commercial operating system. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units.

Executable code 125 may be any executable code, e.g., an application, a program, a process, automated task, software bots configured to manage data communication and user data collection (e.g., botnet), software adapted to perform artificial intelligence (AI), e.g. machine learning, deep learning, task or script. Executable code 125 may be executed by controller 105 possibly under control of operating system 115. Where applicable, executable code 125 may carry out operations described herein in real-time. Computing device 100 and executable code 125 may be configured to update, process and/or act upon information at the same rate the information, or a relevant event, are received. In some embodiments, more than one computing device 100 may be used. For example, a plurality of computing devices (in serial and/or parallel) that include components similar to those included in computing device 100 may be connected to a network and used as a system.

Storage 130 may be or may include, for example, a hard disk drive, a universal serial bus (USB) device or other suitable removable and/or fixed storage unit. Content may be stored in storage 130 and may be loaded from storage 130 into memory 120 and may be stored in read only memory (ROM) to be loaded into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. In some embodiments, computing device 100 receives input from a sensor such as global positioning system (GPS), camera, microphone, accelerometer, light sensor, compass, and any other sensor. It will be recognized that any suitable number of input devices may be operatively connected to computing device 100 as shown by block 135. Output devices 140 may include one or more displays, indicators, speakers, haptic output and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a modem, a universal serial bus (USB) device or external hard drive, cellular network connection, optical network connection, Bluetooth, and NFC may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

Some embodiments may be provided in a computer program product that may include a non-transitory machine-readable medium, with instructions stored thereon, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, a smartphone, IOT device, action specific computerized machine (such as a dedicated robot) or any other suitable computing device. Unless explicitly stated, the method embodiments described herein are not constrained to a particular order or sequence. Additionally, some of the described method embodiments or elements thereof can occur or be performed at the same point in time.

Figure 2:
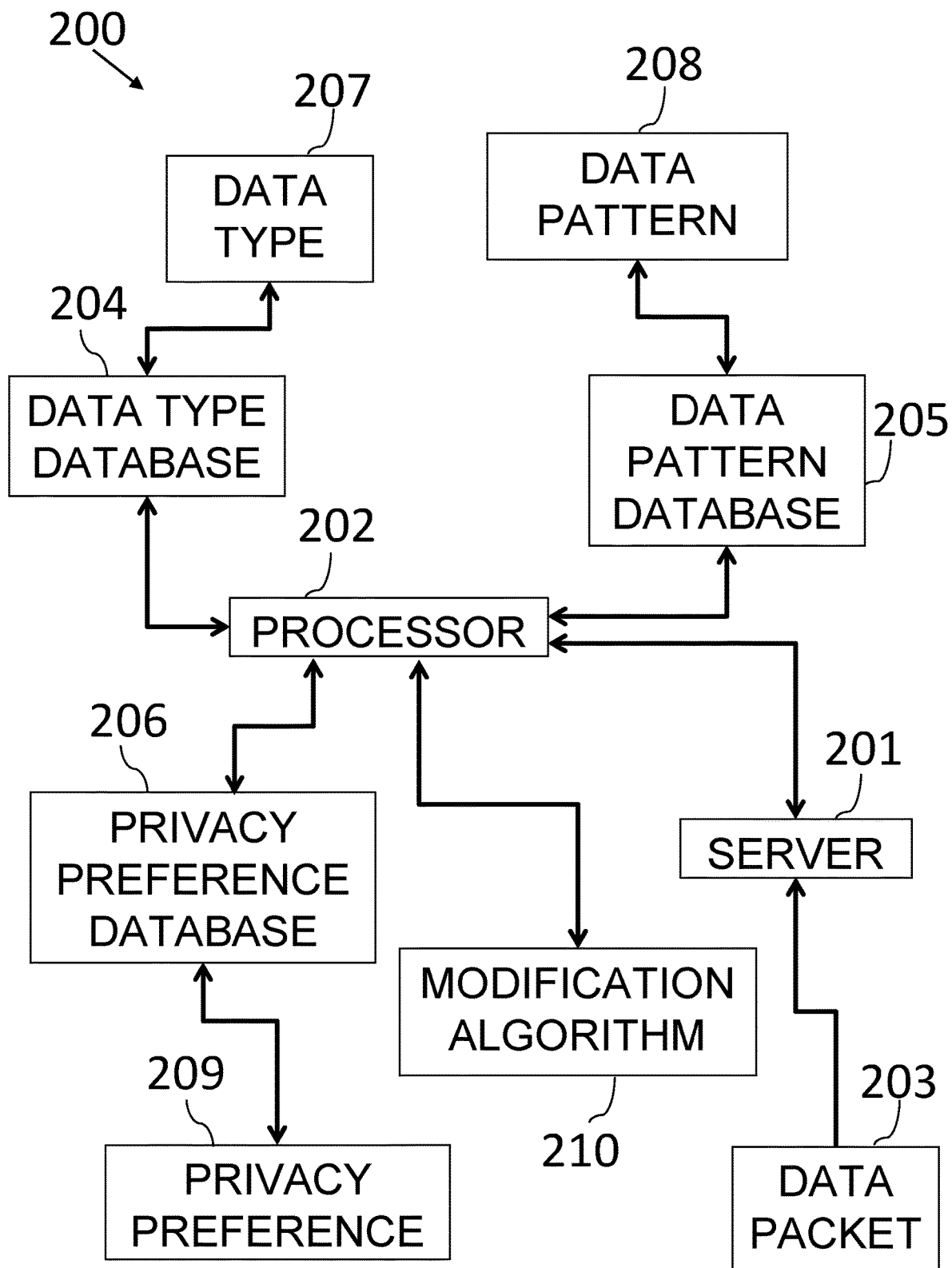
FIG. 2 schematically illustrates a data mapping system, according to some embodiments of the invention.

Reference is now made to FIG. 2, which schematically illustrates a data mapping system 200 for mapping of private data during communication with a remote server 201, according to some embodiments of the invention. The direction of arrows in FIG. 2 may indicate the direction of information flow. In order to manage private data for individual users, data mapping system 200 may initially map data types and data patterns (for example as a calibration process), as further described hereinafter. It should be noted that private data as used hereinafter may refer to any data and/or portion of data representing user's behavior, habits, characteristics, opinions, preferences, tendencies, relations, actions, status parameters (e.g., social, health, economic/wealth, legal, dependencies, being part of group and the like) and the like. In some embodiments, the user may be a computerized device (e.g., IOT, bot and the like) automatically operating on the user's behalf, so that the private data may refer to data and/or characteristics of the computerized device. Private data may also include privacy data and/or privacy preference(s).

A user may choose based on private preference to share some private data and not to share other private data. Users may choose to share same private data with specific server and/or application and not to share it with different servers and/or application. In some embodiments, users may change such preference(s) at any applicable point in time. In some embodiments, private data may be automatically created to represent at least one feature of a computerized device and/or of the user of the computerized device. In some embodiments, private data may include at least one communication pattern and/or communication origin and destination and/or digital footprint and/or digital trace and/or digital response and/or digital reference. In some embodiments, private data may be received from analysis of data and/or from an external sensor and/or other source.

The server 201 may be coupled to processor 202 such as controller 105, shown in FIG. 1. In some embodiments, processor 202 may receive at least one data packet 203 from server 201 to be mapped. For instance, processor 202 may receive at least one data packet 203 from a set of predetermined (or pre-classified) data packets 203. In some embodiments, processor 202 may receive from server 201 a request for sharing at least one data packet 203, for instance a request to share data packet with a contact name or contact directory data, where an automatic response may be created for each such request. It should be noted that data of such responses may also be considered as data packets 203 (e.g., to be mapped).

In some embodiments, data mapping system 200 may include at least one data type database 204 and/or at least one data pattern database 205 and/or at least one privacy preference database 206 coupled to processor 202. In some embodiments, processor 202 may analyze the received data packet 203 to determine data type 207 of the data packet 203, for example by verifying at least one characteristic of the data packet 203. An examplary mapping of data types 207 is shown in FIG. 3A.

In some embodiments, processor 202 may receive (e.g., from a user) privacy preference 209 to map the privacy preference database 206 for each data type and/or data pattern of the at least one data packet 203. In some embodiments, data mapping system 200 may include a modification algorithm 210, coupled to processor 202, and configured to, modify content of data packets according to at least one privacy preference 209 (e.g., nullify a content of a data packet). For example, the user may select a privacy preference 209 for forbidden sharing of location such that modification algorithm 210 may modify the content of the data packet 203 per a predetermined algorithm, for instance randomly modify the location (country) to any other country from a list of countries (e.g., Italy).

Figure 3A:
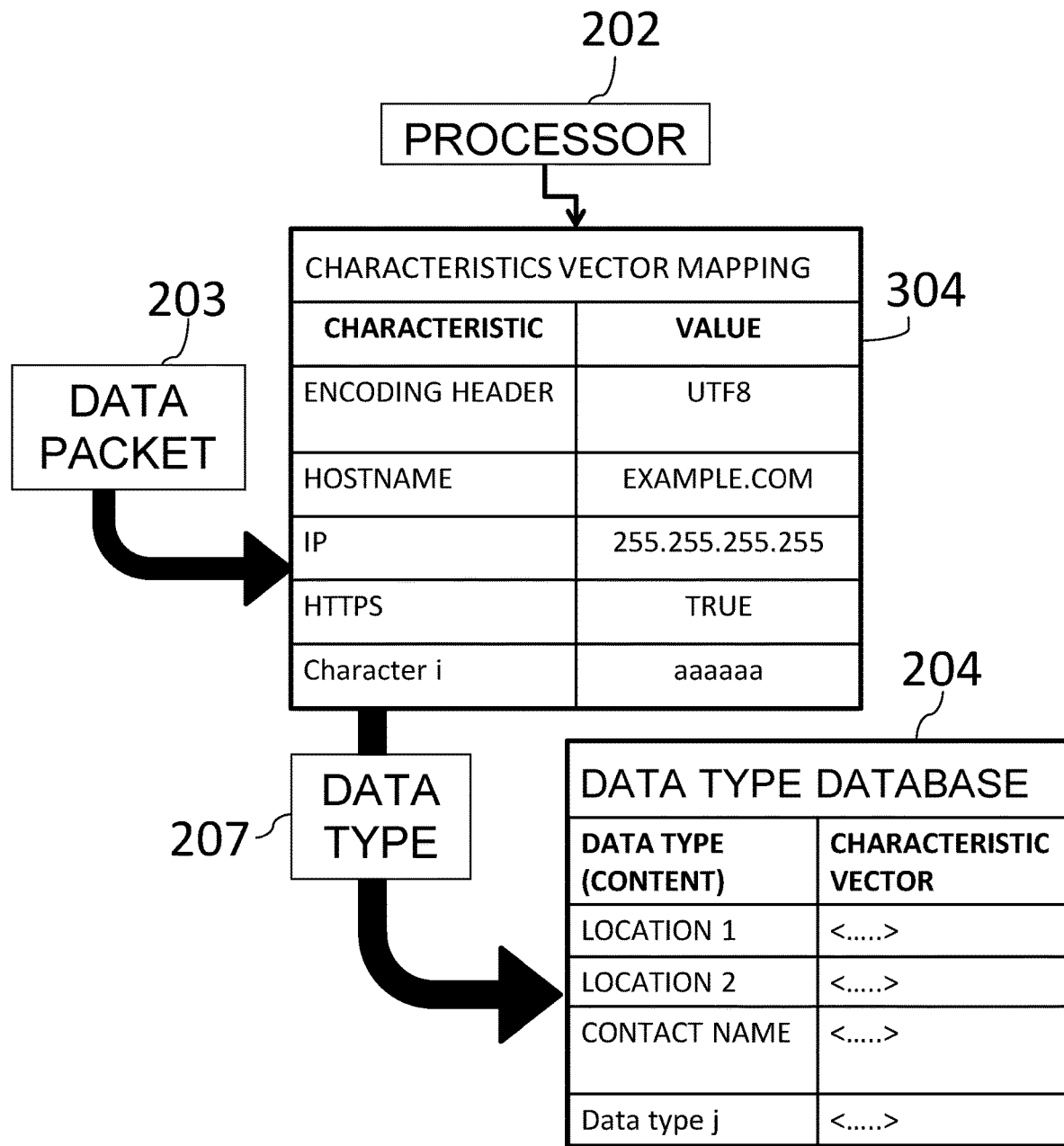
FIG. 3A schematically illustrates examplary mapping of data type database, according to some embodiments of the invention.

Reference is now made to FIG. 3A, which schematically illustrates examplary mapping of data type database 204, according to some embodiments of the invention. Processor 202 may receive a request to share at least one data packet 203 (e.g., from server 201) and analyze characteristics of the at least one data packet 203, for example analyze characteristics of automatically created responses for the request. In some embodiments, the content of the received at least one data packet 203 may be analyzed for purposes of data type mapping.

According to some embodiments, characteristics of the received at least one data packet 203 may be determined and dynamically fitted to an 'i'-dimensional vector 304 (e.g., static characteristics determined from metadata). It should be noted that while the characteristics vector 304 shown in FIG. 3A is five-dimensional, such vectors may have a large number of characteristics. For example, an injective vector having dimensions of 50 characteristics (so that 'i'=50) or more. In some embodiments, an increased number of parameters in the characteristics vector 304 may improve chances of correctly determining the data type 207 until optimal determination of various data types may be achieved.

At least one of the following characteristics of a data packet 203 may be injectively determined for each data packet: header, footer, version number, request by hostname/IP, sent to hostname/IP, server hostname/IP, IP address, file extension, standard title, non-standard title, encryption yes/no, encryption method, encoding yes/no, encoding method (e.g., 'UTF8'), whole file, chunked file, keywords, API version, SDK version, Social plug-in version, driver, communication protocol, action verbs, HTTP/HTTPS, URL Part Names, and/or any other specific character 'i' within the at least one data packet 203. The determined characteristics vector 304 may be associated with a particular data type 207 (since every data packet 203 corresponds to some data type 207), that may be still unknown (e.g., in terms of its content) and for instance indicated as data type 'j'. In some embodiments, processor 202 may receive at least one pre-classified data packet 203 with a known data type. In some embodiments, the data type 207 of characteristics vector 304 for the data-mapping stage, may be determined by reading the content of the corresponding data packet 203, for example reading content for the country name, web browsing history, operating system, etc.

Such data types 207 (or characteristics vectors 304) that are gathered by processor 202, and possibly still having unknown data type content (e.g., data type 'j') at this stage, may be stored (e.g., stored in memory such as memory 120 shown in FIG. 1) at data type database 204 in order to carry out the data type mapping. Processor 202 may map the stored data types to link characteristics vectors 304 with data types 207. In some embodiments, processor 202 may determine that characteristics vectors 304 having at least one identical characteristic may correspond to a particular data type 207 (e.g. Web content search history type).

Reference is now made back to FIG. 2. In some embodiments, data pattern database 205 may include at least one data pattern 208 corresponding to responses to sharing of at least one data packet 203. Similarly to mapping of data types (e.g., as shown in FIG. 3A), processor 202 may map data patterns of responses to request of sharing data packets 203. It should be noted that while the data type 207 of a data packet 203 may correspond to static parameters (e.g., email address), the data patterns 208 may correspond to features of the dynamic data flow of data packet 203 that may be regarded as the "behavior" of the data packet 203.

Figure 3B:
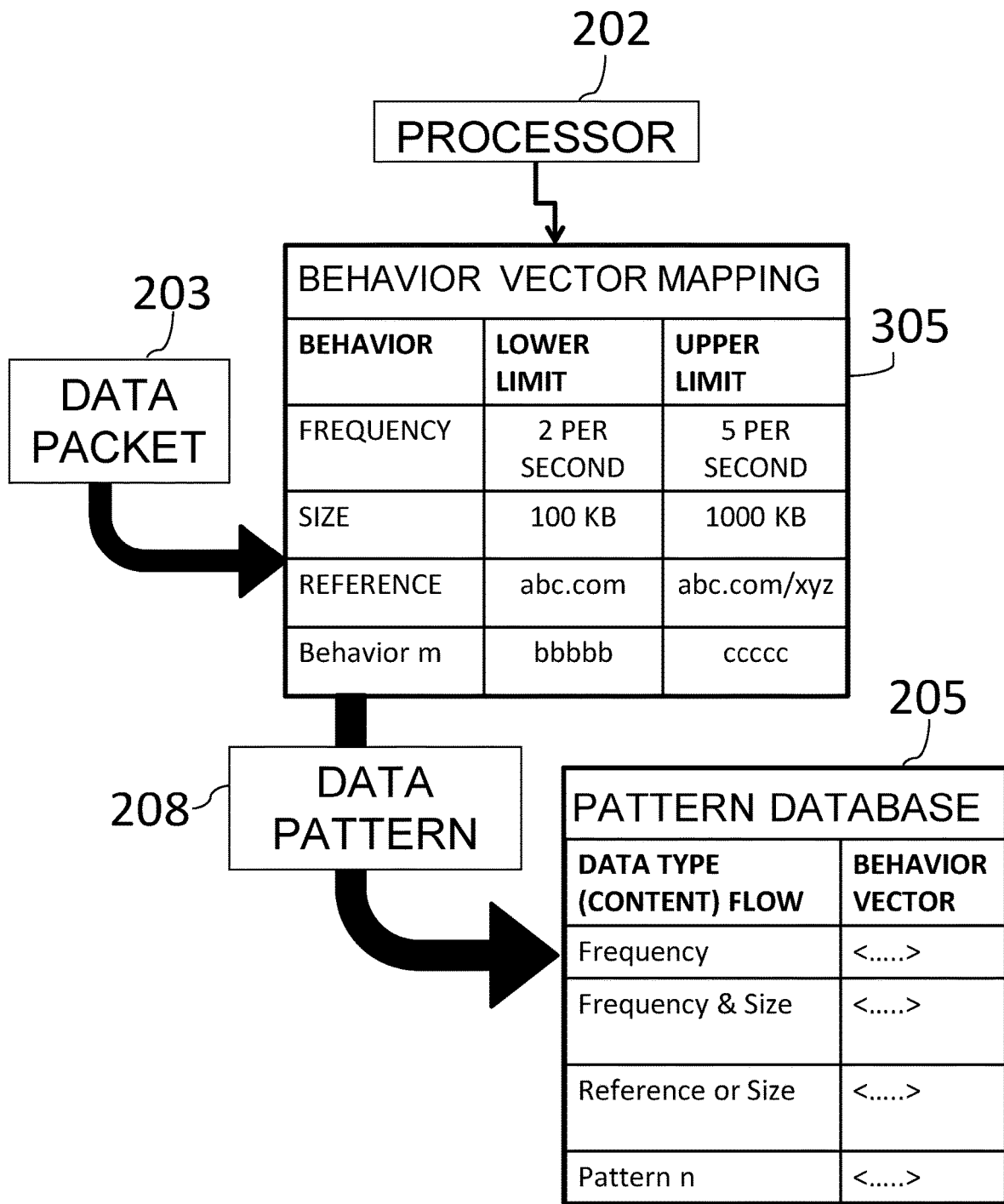
FIG. 3B schematically illustrates examplary mapping of data pattern database, according to some embodiments of the invention.

Reference is now made to FIG. 3B, which schematically illustrates examplary mapping of data pattern database 205, according to some embodiments of the invention. Processor 202 may receive at least one data packet 203 (e.g., from server 201), for example at least one response (or data packet) corresponding to a request for sharing the data packet 203 to analyze pattern behavior of the at least one response (or data packet). In some embodiments, the content of the received at least one data packet 203 may be analyzed to determine the data pattern. For example, at least one response may injectively correspond to a request for sharing at least one data packet 203 and/or a characteristic of the data packet 203 (e.g., a picture file from memory or from camera).

It should be noted that while the pattern vector 305 shown in FIG. 3B is four-dimensional, such vectors may have a large number of features or ranges. For example, an injective vector 305 having dimensions of 100 features and/or ranges (so that 'm'=100) or more. At least one of the following dynamic features of a data pattern may be determined for each data packet: frequency (e.g., appearance(s) per second), size (e.g., in kilobytes), speed (in kilobytes per second), count (e.g., numbers), ratio (e.g., compared to other datatype flow), repeat (e.g., cyclic order), order, server reference (e.g., website reference such as "example.com/feature") and/or any combination thereof and/or other pattern behavior 'm' within the at least one data packet. In some embodiments, ranges for every feature (e.g., frequency) may be determined (e.g., lowest and highest frequency) as a feature of the data pattern 208. In some embodiments, a range may refer to non-discrete values (in contrast to discrete or static values in data type mapping, as shown in FIG. 3A), for instance a range defining number of website sub references (e.g., "example.com/sub-feature/sub-feature" with two sub references).

The determined feature or pattern behavior vector 305 may be associated with a particular data pattern 208 (since every data packet 203 corresponds to some data pattern 208), that may be still unknown and for instance indicated as data pattern 208 'n'. In some embodiments, processor 202 may receive at least one pre-classified data packet 203 with a known data pattern.

Such data patterns 208 that are gathered by processor 202, and possibly still having unknown data pattern 'n' at this stage, may be stored (e.g., stored in memory such as memory 120 shown in FIG. 1) at data pattern database 205 in order to carry out the data pattern mapping. Processor 202 may map the stored data patterns 'n' to link behavior vectors 305 with data patterns 208. In some embodiments, processor 202 may determine that pattern behavior vectors 305 having at least one identical characteristic and/or range may correspond to a data pattern 208 (e.g., same frequency range). In some embodiments, data patterns 208 may be determined according to logical conditions and/or ranges, for example for responses having frequency and size features in within predetermined thresholds.

Figure 3C:
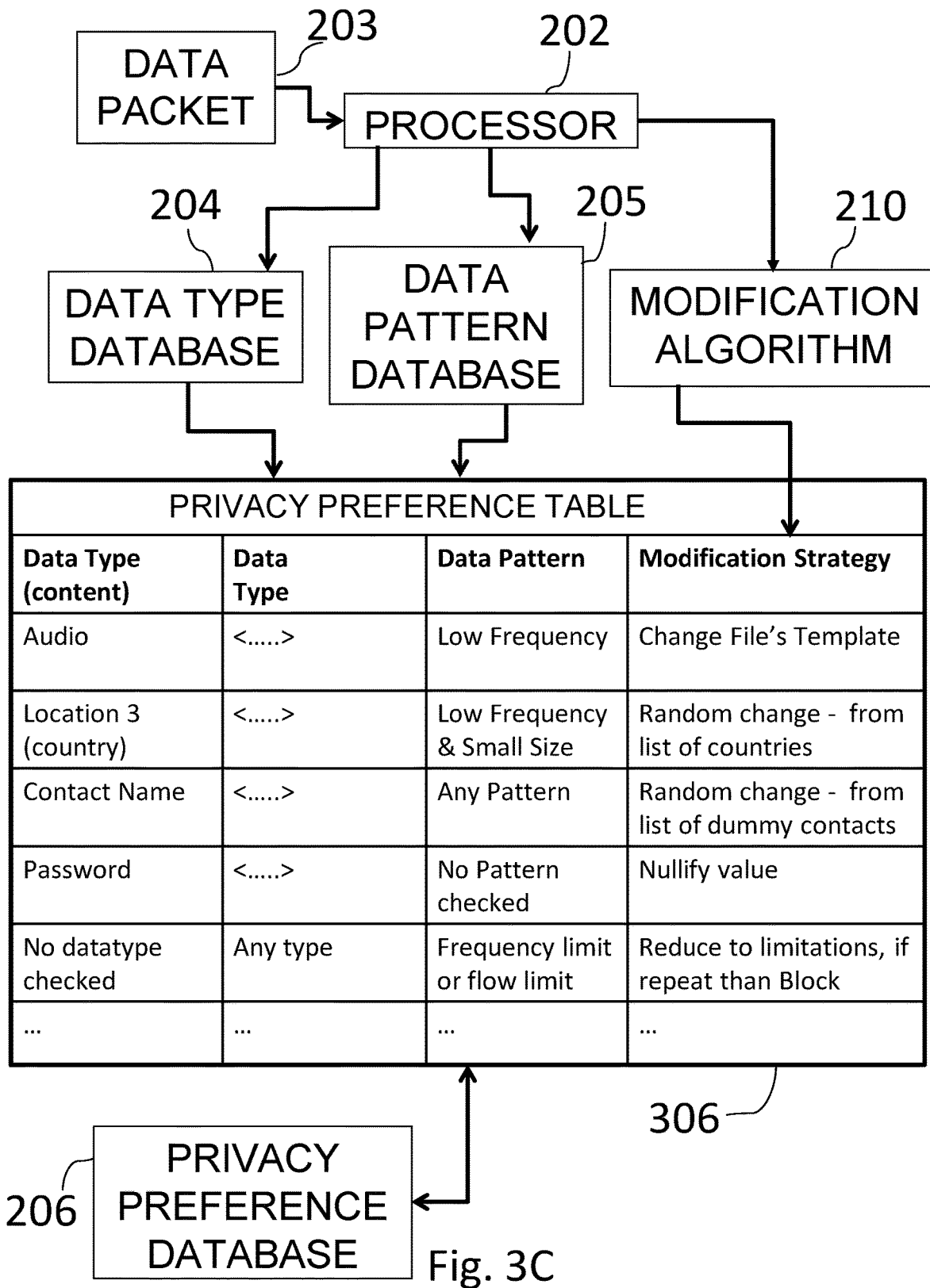
FIG. 3C schematically illustrates examplary mapping of privacy preference table, according to some embodiments of the invention.

Reference is now made to FIG. 3C, which schematically illustrates examplary mapping of privacy preference table 306, according to some embodiments of the invention. Processor 202 may receive at least one data packet 203 (e.g., from server 201), for example at least one response (or data packet) corresponding to a request for sharing the data packet 203 to analyze type and pattern behavior of the at least one response (or data packet) to create data type database 204 and data pattern database 205 as described above. In some embodiments, processor 202 may receive (e.g., from a user) privacy preference database 206 to map the privacy preference table 306 for each data type (content) and/or data pattern of the at least one data packet 203. For example, the user may fill a privacy preference template (e.g., selecting to allow sharing of username) for different options of data types and/or data patterns to determine the privacy preference table 306. In case that some data packet is forbidden for sharing (e.g., contact data and/or a password), the content of that data packet may be, for example randomly, modified by predetermined modification algorithm 210 such that the modified content (e.g., nullified password or randomly replaced to a dummy contact name from a list) may be shared. In some embodiments, processor 202 may only check the data type such that no pattern is checked in order to determine the policy to apply, for example sharing of password data types may be completely forbidden so that data patterns are not checked. In some embodiments, processor 202 may detect an IoT device and only check the data pattern where the data type may not be checked. In some embodiments, processor 202 may only check the data pattern such that no data type is checked, for example checking frequency limit and modifying in accordance with the predefined limitations. In some embodiments, repetition in at least one forbidden characteristic (e.g., forbidden frequency) may cause blocking of data sharing.

Reference is now made back to FIG. 2. In some embodiments, privacy preference database 206 may include at least one privacy preference 209 such as a template to link privacy preferences for the determined data types 207 and/or data patterns 208 and/or modification algorithm 210. For example, privacy preference database 206 may include an un-populated matrix with data types 207 and/or data patterns 208 and/or modification algorithm 210 such that a user may choose which data types (content) 207 and/or data patterns 208 to share. In some embodiments, data mapping system 200 may include a modification algorithm 210, coupled to processor 202, and configured to manage sharing of at least one data packet 203 based on its data type 207 and/or data pattern 208 to comply with at least one privacy preference 209. The operation of the modification algorithm 210 is further described in FIG. 5, hereinafter.

In some embodiments, data mapping system 200 (shown in FIG. 2) may be used as a system to determine collection of uncontrolled information from hardware equipment. Some manufacturers embed into their products, hidden agent(s) which transmits at least one hidden data packet. As may be apparent to one of ordinary skill in the art, such systems and methods may identify "back door" ability which may be part of the hardware core functionality and/or part of unit's embedded software. In some embodiments, by implementing the data mapping system 200 (shown in FIG. 2), unrecognized type and/or pattern of data packet may be determined, wherein the unrecognized type and/or pattern of data packet may be generated internally (in contrast to being requested by the server). Such data packet may be stored and further investigated for its origin and destination.

Figure 4:
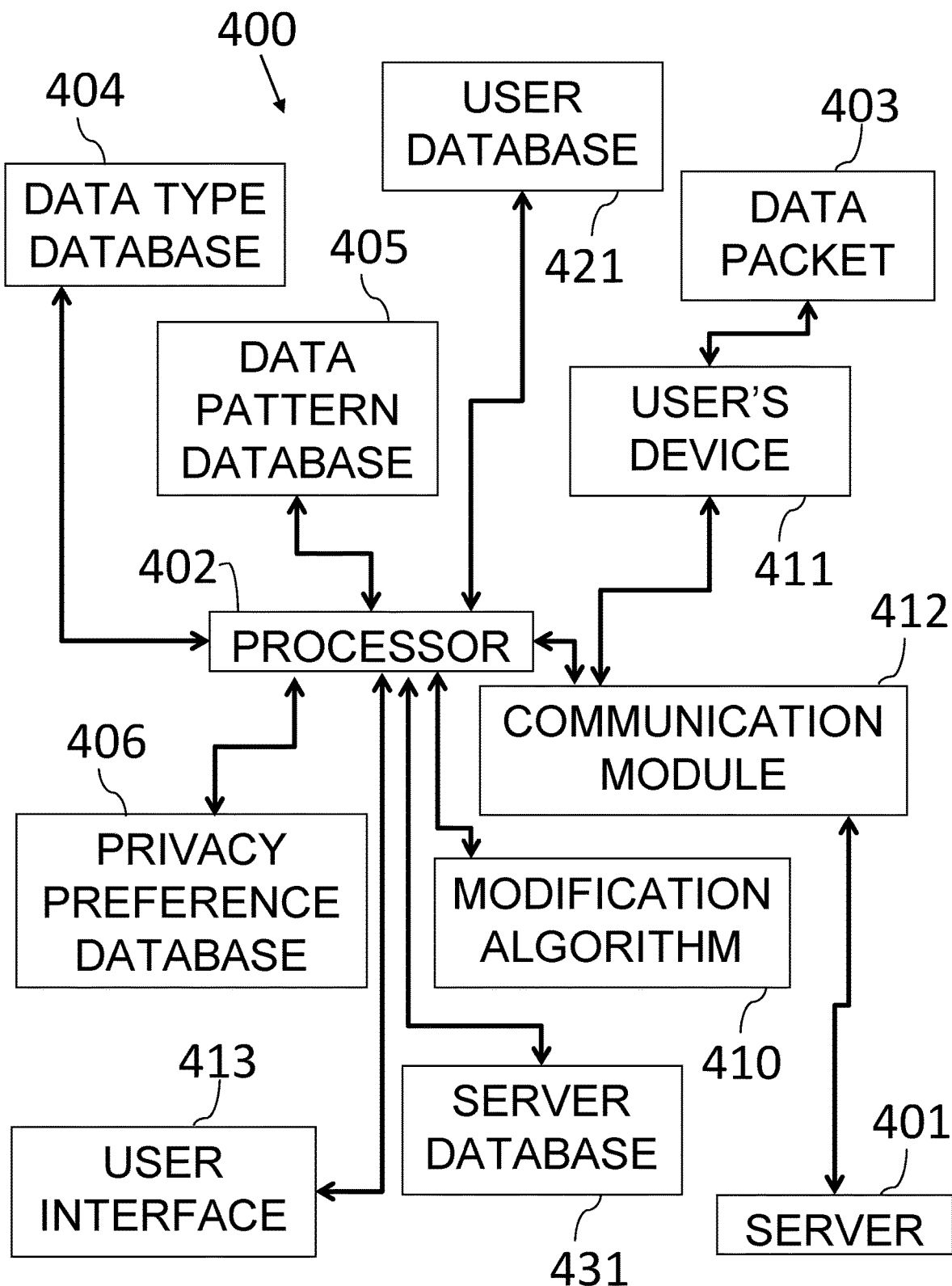
FIG. 4 schematically illustrates a data management system, according to some embodiments of the invention.

Reference is now made to FIG. 4, which schematically illustrates a data management system 400 for dynamic management of private data during communication between a remote server 401 (such as server 201 in FIG. 2) and at least one user's device 411, according to some embodiments of the invention. The direction of arrows in FIG. 4 may indicate the direction of information flow. It should be noted that the at least one user's device 411 may be a computerized device such as computing device 100, shown in FIG. 1.

In some embodiments, data management system 400 may include a data type database 404 (such as data type database 204 in FIG. 2), coupled to processor 402, such that processor 402 may modify data packets (e.g., modify responses) to requests for retrieval of data packets 403 that are not compatible with data types from a data type database 404 and/or with data patterns from a data pattern database 405. In some embodiments, data management system 400 may further include a user interface 413 to issue an alert upon detection of a request for retrieval of data packets 403 that is not compatible with the privacy preference. In some embodiments, data packets 403 from the user's device 411 may be a response created as full or partial extraction(s) selected from the group consisting of any one of user's device files (permanent or temporary), user's device characteristics, user's device indirect attributes, user's device sensor data, user's device browser data, user's device form data, user's device dynamic memory user's device static memory or the like.

In some embodiments, data management system 400 may further include a user database 421 and/or a server database 431 for mapping of users and/or servers. Each user and/or user's device 411 using data management system 400 may be registered in user database 421 with corresponding privacy preference from privacy preference database 406, such that each user and/or user's device 411 may be linked to at least one privacy preference from privacy preference database 406. In some embodiments, server database 431 may include a list of servers 401 for communication with user devices 411. For example, a user may determine a predefine list of servers 401 for sharing of data (e.g., determine a whitelist). Thus, privacy preference database 406 may link privacy and/or sharing preferences for each user and/or server and/or data type and/or data pattern.

In some embodiments, data management system 400 may perform at least one of sharing, blocking and/or modifying, per the modification algorithm 410 (e.g., such as modification algorithm 210, shown in FIG. 2), data packets 403 during communication between server 401 and user's device 411 according to the corresponding privacy preference from privacy preference database 406. For example, requests for sharing of data packets 403 of unrecognized data type may be blocked, requests for sharing of data packets 403 of allowed data type are shared, and requests for sharing of data packets 403 of forbidden data type are modified such that a predetermined response may be shared (e.g., nullify of contact data and randomly change to different mobile carrier from carrier list). In some embodiments, modification algorithm 410 may be configured for each mapped data type and/or data pattern so as to maintain communication as well as the privacy preference by, for example randomly, modifying forbidden data packet (content) for sharing.

In some embodiments, data mapping system 200 (shown in FIG. 2) may be continuously updates such that blocked unrecognized data types may be stored in a dedicated memory (such as memory 120 in FIG. 1) until this data type is mapped and recognized.

In some embodiments, data management system 400 may perform at least one of sharing, blocking and modifying data packets 403 during communication between server 401 and user's device 411 in substantially real time such that the user may continue operation of user's device 411 while data management system 400 may operate in the background and/or operate in application mode for some operating systems (e.g., IOS) and/or some browsers (e.g., Safari). In some embodiments, data management system 400 (in contrast to the data-mapping stage) may handle encrypted data packets 403 since determination of data type does not read and concern the actual content of the data packet 403 even if the content is encrypted. It should be noted that while the mapping stage (e.g., described in FIGS. 2 and 3A-3C) may require reading the content of the data packets for initial determination of data type and/or data pattern and/or privacy preference, the data management system 400, in contrast, does not need to read the actual content of the data packets.

In some embodiments, data management system 400 may include a data pattern database 405 (such as data pattern database 205 in FIG. 2) with at least one data pattern corresponding to sharing of at least one data packet 403 (such as data packet 203 in FIG. 2) from user's device 411. In some embodiments, various data packets may be analyzed (e.g., by a processor) to determine reoccurring data patterns and thereby create data pattern database 405. As may be apparent to one of ordinary skill in the art, computerized devices such as user's device 411 may include a plurality of data packets 403 with various information (e.g., time zone, type of operating system, location, web browsing history, mouse movement, external audio, eye's focus tracking etc.) regarding the user's device 411.

During communication with remote servers such as server 401, the server may send requests for sharing of these data packets 403, wherein the user's device 411 may automatically provide a corresponding response (or data packet) that is compatible with the received request without knowledge, control and/or authorization of the user. According to some embodiments, data management system 400 may manage data packets 403 that are shared with server 401 according to a predefined privacy preference. In some embodiments, data management system 400 may further include a privacy preference database 406 (such as privacy preference database 206 in FIG. 2) with a predetermined privacy preference and/or a list of allowed and/or forbidden types of data packets 403 for sharing and/or modifying and/or, if not recognized, for blocking during communication with the at least one user's device 411. In some embodiments, at least some elements of the data management system 400 may be similar to corresponding elements in data mapping system 200, for example privacy preference database 406 while the content of data packet is not read.

In some embodiments, data management system 400 may further include a communication module 412 configured to allow communication between the server 401 and the at least one user's device 411. In some embodiments, a user may determine at least one privacy preference from privacy preference database 406 with privacy preferences for data types and/or data patterns that the user allows for sharing (and/or forbidden types to be modified and/or, if not recognized types, to be blocked), for example the user may choose to block sharing of location data of any kind.

In some embodiments, data management system 400 may further include a processor 402 (such as controller 105, shown in FIG. 1) coupled to the data pattern database 405 and to the privacy preference database 406. In some embodiments, processor 402 may be coupled to communication module 412. In some embodiments, processor 402 may be embedded in user's device 411. In some embodiments, processor 402 may determine at least one data pattern for sharing of data packet 403 that is for example compatible with the list of allowed types of data packets 403 from data type database 404 for sharing. In some embodiments, processor 402 may be embedded in server 401.

In some embodiments, data management system 400 may operate in user's device 411 (e.g., in the form of internal proxy) to manage sharing of data packets 403, while data management system 400 may not affect other functionalities of the user's device 411 so as to allow uninterrupted usage of the device.

Figure 5:
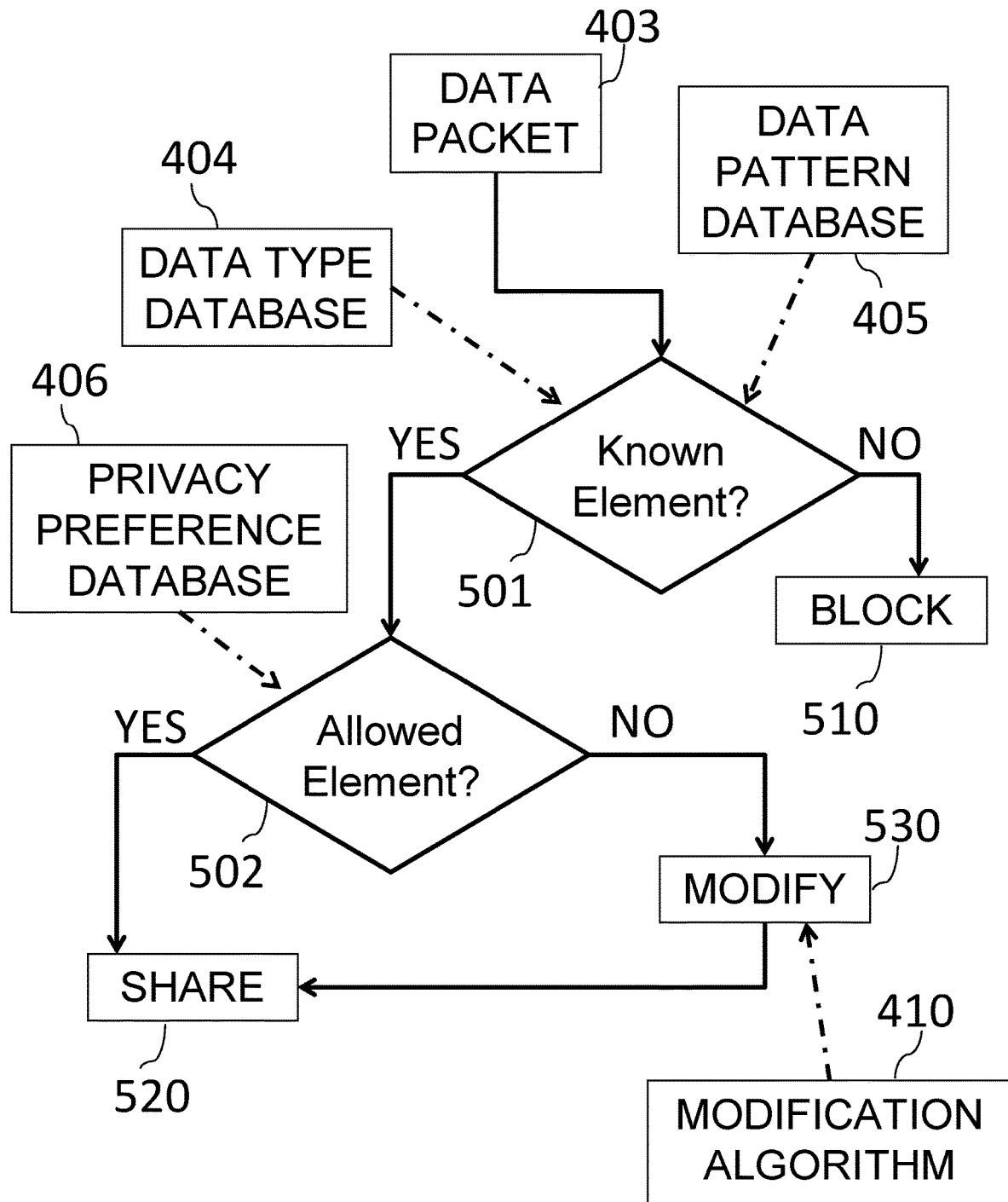
FIG. 5 shows a flowchart for a method of management of data packets with a sharing algorithm during communication between a remote server and a user's device, according to some embodiments of the invention.

Reference is now made to FIG. 5, which shows a flowchart for a method of management of data packets with a sharing algorithm during communication between a remote server and a user's device, according to some embodiments of the invention. The processor (e.g., processor 402) may provide a data packet 403, for instance in response to a request for sharing of data. The received data packet 403 may be checked 501 for known or unknown element, for instance checked 501 for known data type and/or known data pattern based on data type database 404 and/or data pattern database 405. According to some embodiments, unknown elements may be determined as unrecognized and be blocked 510 by the sharing algorithm and not shared (e.g., with the server).

In some embodiments, known elements may be checked 502 for allowed or forbidden elements, for instance checked 502 for allowed data type and/or allowed data pattern based on privacy preference database 406. According to some embodiments, allowed elements may be shared 520 by the sharing algorithm. According to some embodiments, forbidden elements may be, for example randomly, modified 530 by the predetermined modification algorithm 410 with sharing 520 of the modified content (e.g., with the server). For example, a user choosing not to share the country name may choose a privacy preference to modify such data packet to always share a random country name from a list of countries (e.g., "France") by modifying the data packet to be shared with the user, in order to maintain ongoing communication with the server.

It should be noted that with data management system 400, the user may choose features for sharing such that other features that are forbidden for sharing may be modified so as to allow continuous and uninterrupted communication with the server.

Reference is now made to FIG. 6A, which shows a flowchart for a method of dynamic management of private data during communication between a remote server 401 and a user's device 411, according to some embodiments of the invention. In some embodiments, user's device 411 may receive 601 a request for retrieval of at least one data packet 403 from the user's device 411, wherein the user's device 411 may provide a response corresponding to the received request.

In some embodiments, the user's device 411 may determine 602 the data type of the at least one data packet 403 corresponding to the received request. In some embodiments, the user's device 411 may receive 603 a privacy preference for the user's device 411, wherein the privacy preference includes a list of allowed (or forbidden) data packet types for sharing (or randomly modifying per the predetermined modification algorithm for each forbidden data type) during communication. In some embodiments, data packets corresponding to requests for sharing of responses that are not compatible with the received privacy preference may be modified 604. In some embodiments, responses to requests for sharing of data packets 403 of unrecognized type may be blocked. In some embodiments, communication between the remote server 401 and the user's device 411 may be maintained 605 with sharing of the modified data packets (e.g., responses).

In some embodiments, the user's device 411 may determine a pattern of at least one response corresponding to the received request, and modify data packets (e.g., responses) to requests for sharing of data packets 403 corresponding to at least one data pattern that are not compatible with the received privacy preference. In some embodiments, the privacy preference may include a list of allowed data patterns for sharing during communication.

It should be noted that such predetermined modification per each forbidden data packet type, may be a fixed or random action, depend on the user's preference and the content (e.g. nullify for password and randomly change to different country from countries list). For data packets that are not compatible with the received privacy preference (as determined by the user) may allow users to optimally control sharing of their data. For example, a user choosing not to share location data may use the system to randomly modify the data packets during communication (as above) such that the location data may not be transferred via other means (e.g., user's instruction not to share location, application blocking only sensor GPS data while sharing country code data).

In some embodiments, the user's device 411 may include a database with at least one data packet type corresponding to a request for sharing of data packets 403 from the user's device 411, wherein the type of data packets 403 may be determined from the data packet type database. In some embodiments, at least one response may be linked to a type of data packet 403 from the user's device 411, wherein the linking may be based on the data type and data pattern of the at least one response.

In some embodiments, a response corresponding to a request for sharing of data packets may be identified (e.g., by a processor 402), wherein the identified response is not compatible with the received privacy preference. In some embodiments, a response with at least one modified data packet corresponding to the request for sharing types of data packets may be provided per the modification algorithm. In some embodiments, modification of the at least one modified data packet 403 may be selected from the group consisting of data nullification, change of encoding and/or file template, change of header and/or footer, blocking, data randomization, content modification, addition of a predetermined data packet, encryption or the like.

In some embodiments, a communication pattern between the server 401 and the user's device 411 may be identified, wherein the communication pattern may include at least one request for retrieval of at least one data packet 403 from the user's device 411 and corresponding responses. In some embodiments, an alert may be issued (e.g., by a processor 402) upon detection of a change in the identified communication pattern. In some embodiments, data packets 403 from the user's device 411 may be a response created as full or partial extraction(s) selected from the group consisting of any one of user's device files (permanent or temporary), user's device characteristics, user's device indirect attributes, user's device sensor data, user's device browser data, user's device form data, user's device dynamic memory user's device static memory or the like.

Reference is now made to FIG. 6B, which shows a flowchart for a method of dynamic management of private data during communication between a remote server 401 and a user's device 411, according to some embodiments of the invention. In some embodiments, user's device 411 may receive 611 a request for retrieval of at least one data packet 403 from the user's device 411, wherein the user's device 411 may provide a response corresponding to the received request.

In some embodiments, user's device 411 may determine 612 at least one data pattern corresponding to the received request. In some embodiments, user's device 411 may receive 613 a privacy preference for the user's device 411, wherein the privacy preference may include a list of allowed (and/or forbidden) data patterns for sharing (and/or randomly modifying according to the predetermined modification algorithm for each of the forbidden data patterns) during communication. In some embodiments, responses corresponding to requests for sharing of data packets and corresponding data patterns that are not compatible with the received privacy preference may be modified 614. In some embodiments, communication between the remote server 401 and the user's device 411 may be maintained 615 with sharing of the modified responses.

In some embodiments, user's device 411 may determine the type of the at least one data packet 403 of the received request. In some embodiments, requests for sharing of data packets 403 and corresponding data patterns, corresponding to at least one data packet type, that are not compatible with the received privacy preference may be modified. In some embodiments, the privacy preference may include a list of allowed (and/or forbidden) data packet types for sharing (and/or modifying) during communication.

In some embodiments, user's device 411 may include a database with at least one data pattern corresponding to a request for sharing of data packets from the user's device, and wherein the at least one data pattern compatible with the received request may be determined from the database. In some embodiments, user's device 411 may determine the type of the at least one data packet 403 of the received request, and link at least one data pattern to a type of data packet from the user's device 411, wherein the linking may be based on the pattern of the at least one response.

In some embodiments, a data pattern corresponding to a request for sharing of types data packets 403 may be identified (e.g., by a processor 402), wherein the identified data pattern is not compatible with the received privacy preference. In some embodiments, a response with at least one modified data packet corresponding to the request for sharing types of data packets may be provided.

In some embodiments, an alert may be issued (e.g., by a processor 402) upon detection of a request for sharing data packets, wherein the detected request does not correspond to a data type and/or a data pattern and/or a combination thereof that is not compatible with the received privacy preference. In some embodiments, a communication pattern between the server 401 and the user's device 411 may be identified, wherein the communication pattern may include at least one request for retrieval of at least one data packet 403 from the user's device 411 and corresponding responses. In some embodiments, an alert may be issued (e.g., by a processor 402) upon detection of a change in the identified communication pattern.

In some embodiments, a data management system (e.g., data management system 400 as shown in FIG. 4) may be implemented as an exit gatekeeper to monitor outflow communication. For example, in network embedded devices (NED) with limited CPU power, low memory capacity and low power resources means (e.g., internet of things (IOT) device and/or machine to machine and/or machine to server communication and/or other thin client or the like). Outflow communication may be monitored for communication patterns and/or data packet type and/or data pattern and once going out of predefined type and/or pattern range, may limit communication flow and/or block it. This ability to monitor and control outflow communication by the system may prevent for any user's device and/or NED, from being part of communication overloading attacks for example distributed denial of service (DDoS) attack or the like. Such attacks may be created by malicious attackers who are remotely using uncontrolled user's device and/or NED or the like, to generate very high communication flow (e.g., 1 terabyte per second) in short period of time (e.g. hundreds of thousands or more of IP address endpoints at the same time) that basically overload the attacked server(s) until it adversely impacts its ability to function and in some cases creates fatal malfunction in mission critical systems.

Figure 7:
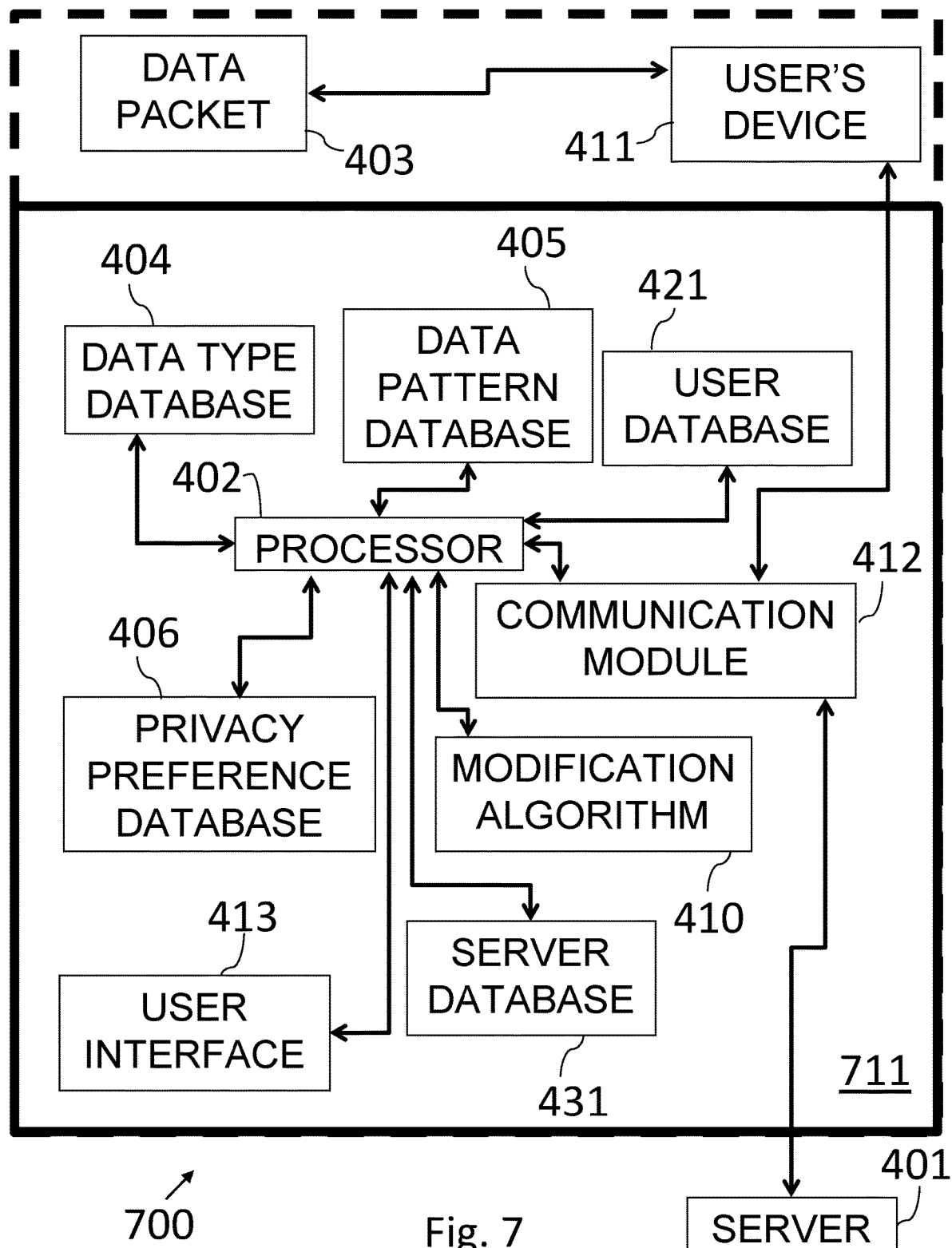
FIG. 7 schematically illustrates a data management system 700 for dynamic management of private data that is embedded on a hardware component, according to some embodiments of the invention.

Reference is now made to FIG. 7, which schematically illustrates a data management system 700 for dynamic management of private data that is at least partially embedded on a hardware component 711 (indicated with a solid line), according to some embodiments of the invention. The data management system 700 may include the communication module and/or processor adjusted and preconfigured to privacy preference methods and processes and/or data storage such as privacy preference database. The data management system 700 may be at least partially embedded on a hardware component 711, for instance embedded on one chip and/or integrated circuit and/or processor. According to some embodiments the system may communicate with server 401 and/or user's device 411 via the communication module 412. In some embodiments, the hardware component 711 (indicated with a solid line) may include at least one privacy preference database that been preconfigured and may be updated only locally so that no remote change can be made, for example by using electrically erasable programmable read-only memories (EEPROMs). In some embodiments, the hardware component 711 (indicated with a solid line) may be embedded and/or added to user's device 411 (indicated with a dashed line).

For example, such data management system 700 may be added into an IOT device (e.g., adding a chip and/or a circuit to the CPU) such that DDoS may be prevented, for example, communication between the IOT device may be monitored and controlled for unusual communication patterns, such that data patterns containing higher frequency (e.g. higher than ten data packets per second) and/or data flow (e.g., higher than 1 megabyte per second) may be blocked by the system, according to privacy preferences determined for that purpose. For example, as shown in FIG. 3C as well. It should be noted that such preferences may only check data patterns where the data type of the data packets in the communication are not checked.

Unless explicitly stated, the method embodiments described herein are not constrained to a particular order in time or chronological sequence. Additionally, some of the described method elements can be skipped, or they can be repeated, during a sequence of operations of a method.

Various embodiments have been presented. Each of these embodiments may of course include features from other embodiments presented, and embodiments not specifically described may include various features described herein.

The invention claimed is:

1. A method of dynamic management of encrypted data during communication between a user's device and a remote server, the method comprising:
   receiving, by the user's device, a request for encrypted communication, wherein the user's device is configured to provide an encrypted response corresponding to the received request, and wherein the encrypted communication comprises encrypted data;
   determining, a content of at least one data packet of the encrypted communication in accordance with characteristics of the at least one data packet corresponding to the received request, and wherein the content of the at least one data packet is not decrypted, and the determination of the content is performed in real time during a communication session between the user's device and the remote server;
   determining, by the user's device, upon determination of the content of at least one data packet, whether to modify the at least one data packet, and in response to determining that the data packet needs to be modified, modifying the at least one data packet to generate a modified encrypted communication; and
   sharing, by the user's device, the modified encrypted communication.

2. The method of claim 1, wherein determining a content of at least one data packet of the encrypted communication, is carried out by the user's device.

3. The method of claim 1, wherein determining a content of the at least one data packet comprises determining at least one data type of the at least one data packet of the encrypted communication in accordance with characteristics of the at least one data packet, and wherein determining whether to modify the at least one data packet is based on the determined data type.

4. The method of claim 3, wherein the communication data type is determined based on data packet characteristics selected from a group consisting of: data packet header, data packet footer, version number, IP (Internet Protocol) address, HTTPS (HyperText Transfer Protocol Secure), file extension, encryption method, encoding method, keywords, driver, and communication protocol.

5. The method of claim 1, further comprising receiving, by the user's device, a preference list for the user's device, wherein determining whether to modify the at least one data packet is based on a comparison of the determined content to the received preference list.

6. The method of claim 5, wherein the preference list includes a user's privacy list of forbidden and/or allowed data packet types for sharing during communication.

7. The method of claim 5, further comprising:
   determining, by the user's device, at least one communication data pattern in accordance with a behavior range of the data packet, and wherein the content of the at least one data packet is not decrypted, and the determination of the at least one communication data pattern is performed in real time during a communication session between the user's device and the remote server;
   wherein the determining whether to modify the at least one data packet, by the user's device is further based on a comparison of the determined at least one communication data pattern and the preference list, whether to modify the at least one data packet, and if so, modifying the at least one data packet; and
   wherein the preference list comprises a list of forbidden and/or allowed data packet types and communication data patterns for sharing during communication.

8. The method of claim 7, wherein the communication data pattern is determined based on communication behavior, wherein the communication behavior consists of: data packet frequency, data packet size, data packet speed, data packet count, data packet ratio compared to other data type flow, data packet repetition, and data packet order.

9. The method of claim 1, wherein the modification of the encrypted communication is selected from the group consisting of: blocking the at least one data packet that is not compatible with the preference list, data nullification, data randomization, content modification, change of encoding, change of file template, change of header, change of footer, addition of a predetermined data packet, and encryption.

10. The method of claim 1, wherein data packets from the user's device are selected from the group consisting of user's device files, user's device characteristics, user's device indirect attributes, user's device sensor data, user's device browser data, user's device form data, user's device dynamic memory and user's device static memory.

11. The method of claim 1, wherein the user's device automatically operates on the user's behalf, and wherein the user's device is selected of: an Internet Of Things (IOT) device, a computer, a server, a bot, and a network embedded device (NED).

12. The method of claim 1, further comprising sending, by the user's device, characteristics vector to remote server for processing.

13. The method of claim 1, further comprising maintaining encrypted communication between the user's device and the remote server by sharing of the modified encrypted communication.

14. A method of dynamic management of encrypted data during communication between a user's device and a remote server, the method comprising:

receiving, by the user's device, a request for encrypted communication, wherein the user's device is configured to provide an encrypted response corresponding to the received request, wherein the encrypted communication comprises encrypted data;

determining, a data type and at least one communication data pattern of at least one data packet of the encrypted communication in accordance with a behavior range of the data packet, and wherein content of the at least one data packet is not decrypted, and the determination of the data type and the at least one communication data pattern is performed in real time during a communication session between the user's device and the remote server;

determining, based on a comparison of the determined data pattern, whether to modify the at least one data packet, and in response to determining that the data packet needs to be modified, modifying the at least one data packet to generate a modified encrypted communication; and sharing, by the user's device, the modified encrypted communication.

15. The method of claim 14, wherein determining data type and at least one communication data pattern of at least one data packet of the encrypted communication, is carried out by the user's device.

16. The method of claim 14, further comprising receiving, by the user's device, a preference list for the user's device, wherein determining whether to modify the at least one data packet is based on a comparison of the determined content to the received preference list.

17. The method of claim 16, wherein the preference list includes a user's privacy list of forbidden and/or allowed data packet types for sharing during communication.

18. The method of claim 14, wherein the communication data pattern of the at least one data packet is determined based on communication behavior, wherein the communication behavior consists of: data packet frequency, data packet size, data packet speed, data packet count, data packet ratio compared to other data type flow, data packet repetition, and data packet order.

19. The method of claim 14, wherein the modification of the encrypted communication is selected from the group consisting of: blocking the at least one data packet that is not compatible with the preference list, data nullification, data randomization, content modification, change of encoding, change of file template, change of header, change of footer, addition of a predetermined data packet, and encryption.

20. The method of claim 14, wherein data packets from the user's device are selected from the group consisting of user's device files, user's device characteristics, user's device indirect attributes, user's device sensor data, user's device browser data, user's device form data, user's device dynamic memory and user's device static memory.

21. The method of claim 14, wherein the user's device automatically operates on the user's behalf, and wherein the user's device is selected of: an Internet Of Things (IOT) device, a computer, a server, a bot, and a network embedded device (NED).

22. The method of claim 14, further comprising sending, by the user's device, characteristics vector to remote server for processing.

23. The method of claim 14, further comprising maintaining encrypted communication between the user's device and the remote server by sharing of the modified encrypted communication.

24. A system for dynamic management of encrypted data during communication between at least one user's device and a remote server, the system comprising:
    a memory storing instructions;
    a communication data type database, comprising at least one communication data type corresponding to sharing of at least one encrypted data packet from the user's device, wherein the encrypted communication comprises encrypted data;
    a preference list database storing a preference list;
    a communication module, to allow encrypted communication between the at least one user's device and the remote server; and
    a processor, coupled to the preference list database, wherein the processor is configured to execute the instructions to:
        determine a content of at least one data packet of the encrypted communication in accordance with characteristics of the at least one data packet, and wherein the content of the at least one data packet is not decrypted, and the determination of the content is performed in real time during a communication session between the user's device and the remote server,
        based on a comparison of the determined content of at least one data packet of the encrypted communication and the preference list, determine whether to modify the at least one data packet, and in response to determining that the data packet needs to be modified, modify the at least one data packet to generate a modified encrypted communication; and
        share the modified encrypted communication.

25. The system of claim 24, wherein the user's device determines the content of the at least one data packet of the encrypted communication.

26. The system of claim 24, wherein determining a content of the at least one data packet comprises determining at least one data type of the at least one data packet of the communication in accordance with characteristics of the at least one data packet, and wherein determining whether to modify the at least one data packet is based on the determined data type.

27. The system of claim 26, wherein the data type is determined based on data packet characteristics selected from a group consisting of: data packet header, data packet footer, version number, IP (Internet Protocol) address, HTTPS (HyperText Transfer Protocol Secure), file extension, encryption method, encoding method, keywords, driver, and communication protocol.

28. The system of claim 24, wherein the system includes a communication data pattern database, comprising at least one communication data pattern corresponding to sharing of at least one encrypted data packet from the user's device and processor which is further configured to determine at least one communication data pattern in accordance with a behavior range of the data packet, and wherein the content of the at least one data packet is not decrypted, and the determination of the at least one communication data pattern is performed in real time during a communication session between the user's device and the remote server, and wherein the determining whether to modify the at least one data packet is further based on a comparison of the determined data pattern and the preference list, whether to modify the at least one data packet, and if so, modifying the at least one data packet.

29. The system of claim 28, wherein the at least one communication data pattern is determined in accordance with a behavior range of the data packet, wherein the behavior range is selected from a group consisting of: data packet frequency, data packet size, data packet speed, data packet count, data packet ratio compared to other data type flow, data packet repetition, and data packet order.

30. The system of claim 24, wherein the preference list includes a user's privacy list of forbidden and/or allowed data packet types for sharing during communication.

31. The system of claim 24, wherein the modification of the encrypted communication is selected from the group consisting of blocking the at least one data packet that is not compatible with the preference list, data nullification, data randomization, content modification, change of encoding, change of file template, change of header, change of footer, addition of a predetermined data packet and encryption.

32. The system of claim 24, wherein data packets from the user's device are selected from the group consisting of user's device files, user's device characteristics, user's device indirect attributes, user's device sensor data, user's device browser data, user's device form data, user's device dynamic memory and user's device static memory.

33. The system of claim 24, wherein the processor automatically operates on the user's behalf, and wherein the processor is selected of: an Internet Of Things (IOT) device, a computer, a server, a bot, and a network embedded device (NED).

34. The system of claim 24, wherein the processor is configured to send a characteristics vector to remote server for processing.

35. The system of claim 24, wherein the processor is configured to maintain encrypted communication between the user's device and the remote server by sharing of the modified encrypted communication.

36. The system of claim 24, wherein the processor is configured to issue an alert based on the comparison of the determined content of the at least one data packet and the preference list.

37. The system of claim 24, wherein at least the communication module and the processor are embedded on a single hardware component.

* * * * *